US010787370B2

(12) United States Patent
Mainini et al.

(10) Patent No.: US 10,787,370 B2
(45) Date of Patent: Sep. 29, 2020

(54) FILTRATION SYSTEM FOR PET WATER FOUNTAIN

(71) Applicant: Radio Systems Corporation, Knoxville, TN (US)

(72) Inventors: Christopher E. Mainini, Knoxville, TN (US); William S. Groh, Knoxville, TN (US); Anita White, Knoxville, TN (US); Kristine Kauerz, Knoxville, TN (US); Stephen Weybrecht, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 234 days.

(21) Appl. No.: 15/625,742

(22) Filed: Jun. 16, 2017

(65) Prior Publication Data

US 2017/0362092 A1 Dec. 21, 2017

Related U.S. Application Data

(60) Provisional application No. 62/352,080, filed on Jun. 20, 2016.

(51) Int. Cl.
*C02F 1/28* (2006.01)
*C02F 1/70* (2006.01)
(Continued)

(52) U.S. Cl.
CPC .............. *C02F 1/003* (2013.01); *A01K 7/00* (2013.01); *C02F 1/281* (2013.01); *C02F 1/283* (2013.01);
(Continued)

(58) Field of Classification Search
CPC ...... C02F 1/283; C02F 1/705; C02F 2103/02; C02F 2103/20; C02F 2201/006; C02F 2301/046; A01K 7/00; A01K 7/022
(Continued)

(56) References Cited

U.S. PATENT DOCUMENTS 1,278,285 A 9/1918 Allen et al.
1,481,365 A 1/1924 William et al.
(Continued)

FOREIGN PATENT DOCUMENTS

AU 2014334919 B2 2/2017
CA 682630 A 3/1964
(Continued)

OTHER PUBLICATIONS

Amendment Filed on Apr. 9, 2016 for Non-final Office Action dated Feb. 1, 2016 for U.S. Appl. No. 14/308,191, filed Jun. 18, 2014, 42 pages.
(Continued)

*Primary Examiner* — Matthew O Savage

(57) ABSTRACT

A filtration system for a pet water fountain is provided. The filtration system utilizes a pump placed within or along a watering bowl. The water filtration system also utilizes a multi-stage filtering device. In one aspect, the multi-stage filtering device includes a first filtering stage representing copper zinc alloy particles, and a second filtering stage representing granulated activated carbon particles. Each stage may constitute filtering material that is separated into an array of cells residing along a vertical frame or is separated into stages placed in series within a tubular cartridge. A method for filtering water in a pet fountain is also provided herein.

6 Claims, 10 Drawing Sheets

(51) Int. Cl.
*A01K 7/00* (2006.01)
*C02F 1/00* (2006.01)
*C02F 5/02* (2006.01)
*C02F 9/00* (2006.01)
*C02F 1/467* (2006.01)
*C02F 1/66* (2006.01)
*C02F 103/02* (2006.01)
*C02F 101/10* (2006.01)
*C02F 101/12* (2006.01)
*C02F 101/20* (2006.01)
*C02F 103/20* (2006.01)

(52) U.S. Cl.
CPC .......... *C02F 1/4676* (2013.01); *C02F 1/4678* (2013.01); *C02F 1/66* (2013.01); *C02F 5/02* (2013.01); *C02F 9/005* (2013.01); *C02F 2101/103* (2013.01); *C02F 2101/12* (2013.01); *C02F 2101/20* (2013.01); *C02F 2103/02* (2013.01); *C02F 2103/20* (2013.01); *C02F 2201/003* (2013.01); *C02F 2201/006* (2013.01); *C02F 2201/46105* (2013.01); *C02F 2301/046* (2013.01); *C02F 2303/04* (2013.01); *C02F 2303/185* (2013.01); *C02F 2303/22* (2013.01); *C02F 2303/24* (2013.01); *C02F 2307/10* (2013.01)

(58) Field of Classification Search
USPC .......................................... 119/51.5, 61.5, 74
See application file for complete search history.

(56) References Cited

U.S. PATENT DOCUMENTS

| | | |
|---|---|---|
| 2,034,968 A | 3/1936 | Bartlett et al. |
| 2,103,653 A | 12/1937 | Weil et al. |
| 2,366,766 A | 1/1945 | Charles et al. |
| 2,510,212 A | 6/1950 | Donnell |
| 2,510,252 A | 6/1950 | Morton et al. |
| 2,510,446 A | 6/1950 | Weil et al. |
| 2,572,379 A | 10/1951 | Jeffery et al. |
| 2,678,630 A | 5/1954 | Frederiksen et al. |
| 2,726,636 A | 12/1955 | Frederiksen et al. |
| 2,775,227 A | 12/1956 | Henry et al. |
| 2,878,781 A | 3/1959 | Otto et al. |
| 3,179,085 A | 4/1965 | McKillip, Jr. |
| 3,228,377 A | 1/1966 | Vincent et al. |
| 3,272,181 A | 9/1966 | Ramsey et al. |
| 3,459,159 A | 8/1969 | Reed et al. |
| 3,505,978 A | 4/1970 | Nilsen et al. |
| 3,537,430 A | 11/1970 | Peppler et al. |
| 3,777,714 A | 12/1973 | Danielsson et al. |
| 3,831,558 A | 8/1974 | Forbes et al. |
| 3,853,429 A | 12/1974 | Wiedenmann et al. |
| 3,868,926 A | 3/1975 | Olde et al. |
| 3,897,753 A | 8/1975 | Lee et al. |
| 3,901,191 A | 8/1975 | Smith et al. |
| 3,903,845 A | 9/1975 | Little et al. |
| 3,920,224 A | 11/1975 | Fassauer et al. |
| 3,979,055 A | 9/1976 | Fathauer et al. |
| 4,022,159 A | 5/1977 | Salvia et al. |
| 4,098,229 A | 7/1978 | Haynes et al. |
| 4,248,177 A | 2/1981 | Peterson et al. |
| 4,347,809 A | 9/1982 | Gloeggler et al. |
| 4,386,582 A | 6/1983 | Adsit et al. |
| 4,463,706 A | 8/1984 | Meister et al. |
| 4,469,049 A | 9/1984 | Waynick et al. |
| 4,512,885 A | 4/1985 | Willinger et al. |
| 4,573,433 A | 3/1986 | Thompson et al. |
| 4,584,966 A | 4/1986 | Moore et al. |
| 4,705,216 A | 11/1987 | Kaffka et al. |
| 4,735,171 A | 4/1988 | Essex et al. |
| 4,747,538 A | 5/1988 | Dunn et al. |
| 4,782,790 A | 11/1988 | Batson et al. |
| 4,807,565 A | 2/1989 | Hawthorne et al. |
| 4,836,142 A | 6/1989 | Duback et al. |
| 4,924,812 A | 5/1990 | Bernays, Jr. et al. |
| 4,976,220 A | 12/1990 | Gershman et al. |
| 4,979,670 A | 12/1990 | Konle |
| 4,993,364 A | 2/1991 | Hessenauer |
| 5,052,343 A | 10/1991 | Sushelnitski et al. |
| 5,122,274 A | 6/1992 | Heskett |
| 5,135,654 A | 8/1992 | Heskett |
| 5,149,437 A | 9/1992 | Wilkinson et al. |
| 5,167,368 A | 12/1992 | Nash et al. |
| 5,198,118 A | 3/1993 | Heskett |
| 5,247,963 A | 9/1993 | Hostetler et al. |
| 5,269,919 A | 12/1993 | Von Medlin |
| 5,269,932 A | 12/1993 | Heskett |
| 5,275,737 A | 1/1994 | Heskett |
| 5,314,623 A | 5/1994 | Heskett |
| 5,329,876 A | 7/1994 | Tracy et al. |
| D350,842 S | 9/1994 | VanSkiver |
| 5,349,925 A | 9/1994 | Zerato et al. |
| 5,369,032 A | 11/1994 | Pratt et al. |
| 5,415,770 A | 5/1995 | Heskett |
| 5,433,171 A | 7/1995 | Ewell et al. |
| 5,433,856 A | 7/1995 | Heskett |
| 5,483,923 A | 1/1996 | Sabbara |
| D367,735 S | 3/1996 | VanSkiver |
| 5,501,178 A | 3/1996 | Kemp et al. |
| 5,510,034 A | 4/1996 | Heskett |
| D374,516 S | 10/1996 | Lillelund |
| 5,599,454 A | 2/1997 | Heskett |
| 5,637,361 A | 6/1997 | Scheurich et al. |
| D383,797 S | 9/1997 | Finnegan |
| 5,778,820 A | 7/1998 | Van et al. |
| 5,799,609 A | 9/1998 | Burns et al. |
| 5,833,859 A | 11/1998 | Heskett |
| 5,837,134 A | 11/1998 | Heskett |
| D402,425 S | 12/1998 | Lacz |
| 5,842,437 A | 12/1998 | Burns et al. |
| 5,934,223 A | 8/1999 | Ellery-Guy |
| 5,951,869 A | 9/1999 | Heskett |
| 5,992,349 A | 11/1999 | Sachs et al. |
| 6,044,795 A | 4/2000 | Matsuura et al. |
| 6,055,934 A | 5/2000 | Burns et al. |
| D428,217 S | 7/2000 | Rodack |
| 6,132,612 A * | 10/2000 | Bourgeois .............. B01J 47/028 210/282 |
| 6,135,056 A | 10/2000 | Kuo et al. |
| 6,149,070 A | 11/2000 | Hones et al. |
| D435,321 S | 12/2000 | Avila |
| 6,197,204 B1 | 3/2001 | Heskett |
| 6,257,560 B1 | 7/2001 | Kim et al. |
| 6,367,417 B1 | 4/2002 | Gal et al. |
| D457,692 S | 5/2002 | Skurdalsvold et al. |
| 6,401,657 B1 | 6/2002 | Krishnamurthy et al. |
| 6,460,483 B1 | 10/2002 | Northrop et al. |
| 6,467,428 B1 | 10/2002 | Andrisin et al. |
| 6,526,916 B1 | 3/2003 | Perlsweig et al. |
| 6,622,657 B2 | 9/2003 | Northrop et al. |
| 6,651,591 B1 | 11/2003 | Chelen |
| 6,651,592 B2 | 11/2003 | Maddox et al. |
| 6,655,934 B2 | 12/2003 | Mittelstein et al. |
| 6,672,253 B1 | 1/2004 | Viola |
| 6,694,916 B1 | 2/2004 | Rucker et al. |
| D490,577 S | 5/2004 | Steinbacher et al. |
| 6,733,356 B2 | 5/2004 | Lee |
| 6,748,669 B1 | 6/2004 | Burgess et al. |
| 6,748,699 B2 | 6/2004 | Taylor |
| 6,792,891 B1 | 9/2004 | Coburn et al. |
| 6,845,735 B1 | 1/2005 | Northrop et al. |
| D503,247 S | 3/2005 | Ross et al. |
| 6,863,025 B2 | 3/2005 | Ness et al. |
| D506,352 S | 6/2005 | Dow et al. |
| D507,755 S | 7/2005 | Reitze et al. |
| D513,930 S | 1/2006 | Novi et al. |
| 6,983,722 B2 | 1/2006 | Tepper et al. |
| 6,988,465 B2 | 1/2006 | Park et al. |
| 6,990,927 B2 | 1/2006 | Axelrod |
| 7,040,249 B1 | 5/2006 | Mushen et al. |
| D522,807 S | 6/2006 | Dow et al. |

(56) References Cited

U.S. PATENT DOCUMENTS

| | | | |
|---|---|---|---|
| D527,224 S | 8/2006 | Roth et al. | |
| 7,089,881 B2 | 8/2006 | Plante et al. | |
| D527,951 S | 9/2006 | Roth et al. | |
| D527,954 S | 9/2006 | Roth et al. | |
| 7,124,707 B1 | 10/2006 | Clarke | |
| 7,146,930 B1 | 12/2006 | Ness et al. | |
| 7,156,994 B1 * | 1/2007 | Archer | C02F 1/003 |
| | | | 210/266 |
| D538,041 S | 3/2007 | Reitze et al. | |
| 7,198,005 B2 | 4/2007 | Polimeni, Jr. et al. | |
| 7,228,816 B2 | 6/2007 | Turner et al. | |
| 7,270,081 B2 | 9/2007 | Park et al. | |
| 7,270,082 B2 | 9/2007 | Plante et al. | |
| D556,511 S | 12/2007 | Mansfield et al. | |
| D558,519 S | 1/2008 | Zemel et al. | |
| D559,472 S | 1/2008 | Abinanti et al. | |
| D562,074 S | 2/2008 | Mansfield et al. | |
| D563,605 S | 3/2008 | Morris et al. | |
| D564,286 S | 3/2008 | Zemel et al. | |
| 7,380,518 B2 | 6/2008 | Kates et al. | |
| 7,389,748 B2 | 6/2008 | Shatoff et al. | |
| RE40,430 E | 7/2008 | Markham | |
| D572,533 S | 7/2008 | Mansfield et al. | |
| 7,395,782 B1 | 7/2008 | Lindsay | |
| D574,183 S | 8/2008 | Broom et al. | |
| D575,986 S | 9/2008 | Cetera et al. | |
| 7,426,901 B2 | 9/2008 | Turner et al. | |
| 7,430,988 B2 | 10/2008 | Perlsweig et al. | |
| 7,458,336 B2 | 12/2008 | Eu et al. | |
| 7,467,603 B2 | 12/2008 | Davies et al. | |
| 7,472,785 B2 | 1/2009 | Albright et al. | |
| D587,529 S | 3/2009 | Pratt et al. | |
| 7,513,216 B2 | 4/2009 | Neckel et al. | |
| D596,461 S | 7/2009 | Mansfield et al. | |
| D598,224 S | 8/2009 | Zanini et al. | |
| 7,624,702 B1 | 12/2009 | Fritz et al. | |
| 7,647,894 B2 | 1/2010 | Axelrod et al. | |
| 7,757,636 B2 | 7/2010 | McCallum et al. | |
| D621,556 S | 8/2010 | Hewson et al. | |
| 7,832,362 B2 | 11/2010 | Deghionno | |
| D629,974 S | 12/2010 | Northrop et al. | |
| 7,849,817 B1 | 12/2010 | Warganich et al. | |
| 7,909,003 B2 | 3/2011 | Willinger | |
| 7,914,468 B2 | 3/2011 | Shalon et al. | |
| D636,539 S | 4/2011 | Montoya et al. | |
| 7,918,186 B2 | 4/2011 | Rowe et al. | |
| D637,770 S | 5/2011 | Lipscomb et al. | |
| 7,946,251 B2 | 5/2011 | Hass | |
| 7,958,844 B1 | 6/2011 | Northrop et al. | |
| 7,984,694 B2 | 7/2011 | Wu et al. | |
| D642,745 S | 8/2011 | Veness et al. | |
| D642,746 S | 8/2011 | Weber et al. | |
| 7,987,817 B2 | 8/2011 | Johnson et al. | |
| 8,011,205 B2 | 9/2011 | Roth et al. | |
| 8,011,324 B1 | 9/2011 | Warganich et al. | |
| D648,904 S | 11/2011 | Tedaldi et al. | |
| D650,861 S | 12/2011 | Chuang et al. | |
| 8,100,084 B1 | 1/2012 | Abramson | |
| 8,141,521 B2 | 3/2012 | Shatoff et al. | |
| 8,146,538 B2 | 4/2012 | Kling et al. | |
| 8,153,176 B2 | 4/2012 | Etayo et al. | |
| D658,818 S | 5/2012 | Lipscomb et al. | |
| D658,819 S | 5/2012 | Lipscomb et al. | |
| D659,301 S | 5/2012 | Lipscomb et al. | |
| D659,914 S | 5/2012 | Lipscomb et al. | |
| 8,166,922 B2 | 5/2012 | Jalbert et al. | |
| 8,171,885 B1 | 5/2012 | Northrop et al. | |
| 8,225,747 B2 | 7/2012 | Markham et al. | |
| D665,134 S | 8/2012 | Lipscomb et al. | |
| D665,870 S | 8/2012 | Fang et al. | |
| 8,245,665 B2 | 8/2012 | Willett et al. | |
| 8,347,817 B1 | 1/2013 | Miller et al. | |
| D677,018 S | 2/2013 | Miller et al. | |
| 8,367,130 B1 | 2/2013 | Tsengas | |
| 8,381,685 B2 | 2/2013 | Lipscomb et al. | |
| 8,387,566 B2 | 3/2013 | Graves et al. | |
| D681,887 S | 5/2013 | Fang et al. | |
| D681,888 S | 5/2013 | Fang et al. | |
| 8,436,735 B2 | 5/2013 | Mainini et al. | |
| 8,464,664 B1 | 6/2013 | Scheffler | |
| D686,783 S | 7/2013 | Pluss et al. | |
| 8,474,404 B2 | 7/2013 | Costello | |
| 8,511,255 B2 | 8/2013 | Hass et al. | |
| 8,516,975 B2 | 8/2013 | Becattini, Jr. et al. | |
| 8,516,977 B2 | 8/2013 | Shatoff et al. | |
| D689,245 S | 9/2013 | Rowe et al. | |
| D692,623 S | 10/2013 | Lipscomb et al. | |
| 8,555,814 B2 | 10/2013 | Parks et al. | |
| D694,477 S | 11/2013 | Rowe et al. | |
| 8,701,595 B2 | 4/2014 | Jin et al. | |
| D704,388 S | 5/2014 | Fang et al. | |
| D704,389 S | 5/2014 | Fang et al. | |
| D704,392 S | 5/2014 | Fang et al. | |
| D704,903 S | 5/2014 | Fang et al. | |
| 8,714,112 B2 | 5/2014 | Kling et al. | |
| D709,655 S | 7/2014 | Lipscomb et al. | |
| 8,770,147 B2 | 7/2014 | Rowe et al. | |
| 8,776,725 B1 | 7/2014 | Grijalva | |
| 8,800,494 B2 | 8/2014 | Lipscomb et al. | |
| 8,875,658 B2 | 11/2014 | Anderson et al. | |
| 8,893,653 B2 | 11/2014 | Browning et al. | |
| 8,904,967 B2 | 12/2014 | Reiss et al. | |
| 8,925,485 B2 | 1/2015 | Pu et al. | |
| 8,944,006 B2 | 2/2015 | Anderson et al. | |
| 9,004,011 B2 | 4/2015 | Foley | |
| 9,004,012 B2 | 4/2015 | Taylor | |
| 9,060,528 B2 | 6/2015 | Axelrod | |
| 9,156,950 B2 | 10/2015 | Etayo et al. | |
| 9,260,223 B2 | 2/2016 | Kim et al. | |
| 9,295,233 B2 | 3/2016 | Axelrod et al. | |
| 9,301,496 B2 | 4/2016 | Reiss et al. | |
| 9,339,011 B1 | 5/2016 | Crabtree | |
| 2002/0189548 A1 | 12/2002 | Northrop et al. | |
| 2002/0195001 A1 | 12/2002 | Hester et al. | |
| 2004/0118356 A1 | 6/2004 | Krishnamurthy et al. | |
| 2004/0194714 A1 | 10/2004 | Lee | |
| 2005/0061252 A1 | 3/2005 | Meeks et al. | |
| 2005/0166853 A1 | 8/2005 | Plante et al. | |
| 2005/0217591 A1 | 10/2005 | Turner et al. | |
| 2005/0284382 A1 | 12/2005 | Stantchev et al. | |
| 2006/0011145 A1 | 1/2006 | Kates et al. | |
| 2006/0027179 A1 | 2/2006 | Welbourne et al. | |
| 2006/0231040 A1 | 10/2006 | Bast et al. | |
| 2006/0236948 A1 | 10/2006 | Wechsler et al. | |
| 2007/0266959 A1 | 11/2007 | Brooks et al. | |
| 2008/0011243 A1 | 1/2008 | Moulton | |
| 2008/0058670 A1 | 3/2008 | Mainini et al. | |
| 2008/0127904 A1 | 6/2008 | Kling et al. | |
| 2008/0190374 A1 | 8/2008 | Farris et al. | |
| 2008/0257272 A1 | 10/2008 | Bolda et al. | |
| 2008/0264963 A1 | 10/2008 | Teodorescu | |
| 2010/0030366 A1 | 2/2010 | Scherer et al. | |
| 2010/0089329 A1 | 4/2010 | Lefferson et al. | |
| 2010/0132629 A1 | 6/2010 | Jalbert et al. | |
| 2010/0147760 A1 | 6/2010 | Leavitt et al. | |
| 2011/0017141 A1 | 1/2011 | Hewson et al. | |
| 2011/0067638 A1 | 3/2011 | Lipscomb et al. | |
| 2011/0139076 A1 | 6/2011 | Pu et al. | |
| 2011/0259273 A1 | 10/2011 | Lipscomb et al. | |
| 2011/0265726 A1 | 11/2011 | Banuelos | |
| 2011/0297090 A1 | 12/2011 | Chamberlain et al. | |
| 2011/0297091 A1 | 12/2011 | Chamberlain et al. | |
| 2012/0006282 A1 | 1/2012 | Kates | |
| 2012/0017839 A1 | 1/2012 | Veness et al. | |
| 2012/0137979 A1 | 6/2012 | Lipscomb et al. | |
| 2012/0216751 A1 | 8/2012 | Rowe et al. | |
| 2012/0325156 A1 | 12/2012 | Abramson | |
| 2013/0013104 A1 | 1/2013 | Carelli et al. | |
| 2013/0019809 A1 | 1/2013 | McCallum et al. | |
| 2013/0036981 A1 | 2/2013 | Lipscomb et al. | |
| 2013/0087102 A1 | 4/2013 | Lipscomb et al. | |
| 2013/0174790 A1 | 7/2013 | Lipscomb et al. | |
| 2013/0180458 A1 | 7/2013 | Lipscomb et al. | |
| 2013/0199454 A1 | 8/2013 | Lipscomb et al. | |

(56) References Cited

U.S. PATENT DOCUMENTS

| | | | |
|---|---|---|---|
| 2013/0213872 A1* | 8/2013 | Phelan | C02F 1/42 210/198.1 |
| 2013/0228508 A1 | 9/2013 | Lipscomb et al. | |
| 2014/0069341 A1 | 3/2014 | Lipscomb et al. | |
| 2014/0090601 A1 | 4/2014 | Stone et al. | |
| 2014/0158209 A1 | 6/2014 | Schiller et al. | |
| 2014/0251223 A1 | 9/2014 | Rowe et al. | |
| 2014/0263423 A1 | 9/2014 | Akdogan et al. | |
| 2017/0130432 A1 | 5/2017 | Searcy et al. | |

FOREIGN PATENT DOCUMENTS

| | | |
|---|---|---|
| CA | 1325561 C | 12/1993 |
| CN | 201234507 Y | 5/2009 |
| CN | 202232489 U | 5/2012 |
| CN | 202285810 U | 7/2012 |
| CN | 202310841 U | 7/2012 |
| CN | 202551860 U | 11/2012 |
| CN | 203985484 U | 12/2014 |
| EP | 0610171 A2 | 8/1994 |
| EP | 0636312 A1 | 2/1995 |
| EP | 1145627 A2 | 10/2001 |
| EP | 1300074 A2 | 4/2003 |
| EP | 1360895 A2 | 11/2003 |
| GB | 2454658 A | 5/2009 |
| JP | H0736686 U | 7/1995 |
| JP | 2599615 Y2 | 9/1999 |
| KR | 20110115696 A | 10/2011 |
| KR | 101127936 B1 | 3/2012 |
| WO | WO-03015003 A1 | 2/2003 |

OTHER PUBLICATIONS

Animal Planet Pet Feeder available through Amazon.com, accessed on Jun. 27, 2014, 1 page.
Aspen Automatic Pet Feeder Available through Amazon.com, accessed on Jun. 27, 2014, 1 page.
Australian Patent Examiner's First Report on Patent Application No. 2014334919 dated Dec. 9, 2016, 3 pages.
Auto Pet Feeder Available through www.autopet-feeder.com, accessed on Apr. 24, 2015 and Dec. 26, 2015, 4 pages.
Certificate of Patent Grant from the Australia IP Office for Reciprocal Corresponding Patent No. 2014334919 dated Jun. 2017, 1 page.
Chinese office action for Chinese Application No. 2014800355223 dated Jan. 16, 2017, 15 pages.
CIPO Office Action for CA Application No. 2911406 dated Jun. 13, 2017, 3 pages.
Co-pending Design U.S. Appl. No. 29/448,927, filed Mar. 14, 2013, 3 pages.
Co-pending Design U.S. Appl. No. 29/449,001, filed Mar. 14, 2013, 3 pages.
Crestuff Automatic Portion Control Pet Feeder available through Amazon.com, accessed on Jun. 27, 2014, 1 page.
Ergo Auto Pet Feeder available through Amazon.com, accessed on Apr. 6, 2015, 3 pages.
ETSY website from Ceramic Pet Bowl Artist printed Mar. 26, 2013, 2 pages.
Extended European Search Report for European Application No. 14854865.4 dated Jun. 21, 2017, 15 pages.
Extended European Search Report for European Application No. 17176845.0 dated Oct. 9, 2017, 8 pages.
Gate Feeder available through http://gatefeeder.com, accessed on Apr. 6, 2015, 3 pages.
Gatefeeder Smart Pet Feeder available through http://gatefeeder.com/, accessed on Apr. 20, 2014 and Dec. 26, 2015, 4 pages.
Gizmag, Furbo lets you dispense dog treats from afar, http://wvvw.gizmag.com/furbo-pet-treat-camera/43038/, accessed on Jun. 24, 2016, 3 pages.
Indiegogo, https://www.indiegogo.com/projects/furbo-world-s-best-treat-tossing-dog-camera#/, accessed on Jun. 24, 2016, 3 pages.
International Preliminary Report on Patentability for Application No. PCT/US2014/043059 dated Dec. 22, 2015, 11 pages.
International Search Report and Written Opinion for Application No. PCT/US2014/043059 dated Apr. 29, 2015, 13 pages.
Lusmo Automatic Pet Feeder available through lusmo.com, accessed on Apr. 6, 2015, 9 pages.
Lusmo Automatic Pet Feeder available through www.lusmo.com, accessed on Apr. 20, 2014 and Dec. 26, 2015, 8 pages.
MOTA Automatic Pet Feeder available through www.mota.com, accessed on Apr. 24, 2015 and Dec. 26, 2015, 4 pages.
MOTA Perfect Pet Dinner Automatic Food Feeder available through Walmart, accessed on Apr. 6, 2015, 2 pages.
Non-Final Office Action dated Dec. 9, 2013 for U.S. Appl. No. 13/345,261, filed Jan. 6, 2012, 12 pages.
Non-Final Office Action dated Feb. 1, 2016 for U.S. Appl. No. 14/308,191, filed Jun. 18, 2014, 23 pages.
Notification of Transmittal of International Search Report and Written Opinion of the ISA for Application No. PCT/US2014/043059 dated Apr. 29, 2015, 2 pages.
Partial Supplementary European Search Report for European Application No. 14854865.4 dated Feb. 3, 2017, 7 pages.
Perfect Pet Feeder available through www.perfectpetfeeder.com, accessed on Apr. 20, 2014 and Dec. 26, 2015, 10 pages.
Perfect Petfeeder available through perfectpetfeeder.com/, accessed on Apr. 6, 2015, 9 pages.
Pet mate Infinity Portion Control Pet Feeder available www.amazon.com/Petmate-Infinity-Portion, accessed on Apr. 24, 2015, 2 pages.
Pet Watch Automatic Pet Feeder available through www.amazon.com/watchautomatic-feeder, accessed on Apr. 24, 2015, 5 pages.
Petmate Infinity 5 lb Portion Control Automatic Dog Cat Feeder available through www.amazon.com, accessed on Apr. 6, 2015, 2 pages.
PetNet Automatic Pet Feeder available through www.petnet.io/, accessed on Apr. 20, 2014 and Dec. 26, 2015, 8 pages.
Petnet Pet Feeder available through www.petnet.io, accessed on Apr. 6, 2015, 5 pages.
PetSafe Pet Feeder available through Amazon.com, accessed on Jun. 27, 2014, 1 page.
Petwant Automatic Pet Feeder available through Amazon.com, accessed on Jun. 27, 2014, 1 page.
International Search Report and Written Opinion for Application No. PCT/US2018/34101 dated Aug. 24, 2018, 11 pages.
Super Feeder available through super-feeder.com, accessed on Apr. 6, 2015, 6 pages.
Super-Feeder Programmable Pet Feeder available through www.super-feeder.com, accessed on Apr. 20, 2014 and Dec. 26, 2015, 9 pages.
Watch Automatic Pet Feeder available through Amazon.com, accessed on Apr. 6, 2015, 5 pages.
KDF Process Media published by Fluid Treatment, Inc. (Apr. 2003).

* cited by examiner

FILTRATION SYSTEM FOR PET WATER FOUNTAIN

CROSS REFERENCE TO RELATED APPLICATIONS

This application claims the benefit of U.S. Ser. No. 62/352,080 filed Jun. 20, 2016. That application is entitled "Filtration System For Pet Water Fountain, And Method For Water Filtration," and is incorporated herein in its entirety by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light and not necessarily as admissions of prior art.

Field of the Invention

The present inventive concept relates to the field of water filtration. More particularly, the invention relates to filtration systems for a pet water fountain and an improved method of water filtration.

Technology in the Field of the Invention

Various water treatment systems have been developed in recent decades. These include treatment systems for waste water, systems for drinking water, and systems for water softening. The purposes of these treatments vary, but the final goal of all of these systems is to provide the consumer with a water supply that is improved; that is, the water quality is improved to meet specifications or to enhance taste.

In recent years, pet watering fountains have been developed that incorporate at least some level of water treatment for pets. Typically, water treatment will include the use of a small, submersible "aquarium" pump that enables the circulation of water in a watering bowl. Such treatment will also include a first (or macro) filter that catches hair and food particles during circulation. Optionally, a second (or micro) filter is provided that catches smaller particles before water enters the pump.

It is observed that many animals have a preference for drinking flowing water. Pet water fountains that incorporate a pump for circulating water encourage domestic animals to drink more liquids. This, in turn, can help reduce problems with the animal's kidneys or urinary tract. In addition, flowing water typically has more dissolved oxygen, which can make the water taste better for the animal as well as provide potential health benefits. For these reasons, pet water fountains that utilize a pump have become popular.

One of the challenges with pet fountains is keeping the watering bowl and filtering components clean. If fountains are not properly cleaned and maintained, the benefits of animal watering fountains can be reduced or even reversed. This typically requires the frequent disassembling of the fountain, rinsing of the filtering media, and washing of the small pump and basin. Some of this cleaning may involve the removal of scale and mineral deposits.

Currently pet fountains offer only minimal particle filtration without treating the water chemistry itself. Accordingly, a need exists for a pet water fountain that contains an improved filtration system that catches contaminates while also reducing the buildup of scale, scum, and sediment in the pump and basin. A need further exists for a pet fountain that utilizes filtration media arranged in layers or stages, having sized openings.

BRIEF SUMMARY OF THE INVENTION

A pet water fountain that employs a multi-stage filtering device is provided herein. The pet water fountain includes a basin configured to hold a volume of water. The basin may be of any configuration and volume so long as a domesticated pet, such as a dog or cat, can access the aqueous contents therein. The filtration system utilizes a pump with a pump inlet and at least one pump outlet. The pump is configured to circulate water within the basin. In one aspect, the pump is a submersible pump that is placed within or along the basin. The outflow of water from the pump may be split into at least two streams, which heightens animal interest and improves oxygenation.

The multi-stage filtering device of the pet water fountain is configured to filter water during circulation so as to (i) reduce sediment and hair from the water, (ii) remove at least a portion of chlorine, (iii) reduce bacteria, and (iv) reduce organic and inorganic particles. In one aspect, the multi-stage filtering device includes a first filtering stage comprising copper alloy particles, and a second filtering stage comprising granulated activated carbon particles. The copper alloy particles of the first stage may be copper zinc alloy particles.

The first stage and second stage of the filtering device may be disposed near the pump inlet or at a pump outlet. For example, the first stage of the filtering device may reside near the pump inlet, and the second stage may reside near a pump outlet. Alternatively, the second stage resides near the pump inlet, and the first stage resides near a pump outlet. In other embodiments, both the first and second stages reside near the pump inlet. Conversely, both the first and second stages may reside near the pump outlet.

In one embodiment, the first stage, the second stage, or both the first and second stages together reside within a tubular body. A first porous screen resides along a first end of the tubular body and a second porous screen resides along a second, opposite end of the tubular body. When so disposed, the first and second porous screens maintain the first and second stages in place within the tubular body during water circulation.

In one aspect, the tubular body is in fluid communication with the pump inlet or a pump outlet. Preferably, the tubular body holds at least two first stage compartments and at least two second stage compartments, with the first and second stage compartments alternating in series.

In an exemplary embodiment, the copper alloy particles are divided into portions and are placed along discreet cells within a frame to form the first stage. In one aspect, each of the cuprous cells of the first stage further comprises a salt.

The granulated activated carbon particles may also be divided into portions and placed along discreet cells within a frame to form the second stage. The frames of each of the first and second stages provide vertical support for the discreet cells.

The particles of each of the first and second stages may be at least partially covered by a porous substrate. The porous substrate defines discreet covers for encasing particles of each of the first and second stages. In one aspect, the porous substrate comprises synthetic fibers, cellulosic fibers, or combinations thereof. In another aspect, the porous substrate is fabricated from woven fibers, non-woven fibers, or combinations thereof. The porous substrate may additionally be comprised of any other material that may be appropriate for encasing filtering media while permitting a through-flow of water.

The pet water fountain may additionally comprise a reservoir. The reservoir is configured to receive a portion of the water delivered from the pump outlet during water circulation. The reservoir is additionally configured to release water to a spout above the basin. In such embodiments, the first stage, the second stage, or both, may reside in vertical orientation within or below the reservoir. In one aspect, frames forming the first and second stages are positioned vertically within the water fountain between the pump outlet and a weir or a spout.

A filtration system for a pet water fountain is additionally provided herein. The filtration system utilizes a pet water fountain in accordance with the embodiments described above.

The filtration system includes a first stage comprising a copper alloy filtering medium. A second stage is further included that comprises a granulated activated carbon filtering medium. The first and second stages form two stages of a multi-stage filter device. The multi-stage filtering device is configured to filter water during circulation so as to (i) reduce sediment and hair from the water, (ii) remove at least a portion of chlorine, (iii) reduce bacteria, (iv) reduce organic and inorganic particles, or (v) combinations thereof.

In one aspect of the filtration system, the copper alloy medium is comprised of copper alloy particles. The copper alloy particles are divided into portions and placed along discreet cells within a frame to form the first stage. In addition, the granulated activated carbon medium may be comprised of activated carbon particles. The activated carbon particles are also divided into portions and placed along discreet cells within a frame to form the second stage. In certain embodiments, the first stage may further comprise salt pellets.

In certain aspects, the particles in the cells of each of the first and second stages are at least partially covered by a porous substrate. The porous substrate further defines discreet covers for encasing particles of each of the first and second stages. The porous substrate may be fabricated from synthetic fibers, cellulosic fibers, or combinations thereof.

The copper alloy particles of the filtration system may comprise copper and zinc. The copper alloy particles may be comprised of about 85% copper and about 15% zinc. Alternatively, the copper ally particles may be comprised of about 50% copper and 50% zinc. Alternatively, the copper alloy particles may comprise the copper ally particles comprise between about 50% and 85% copper, and between about 15% and 50% zinc. Such alloys may include brass, or be referred to as brass.

A method of filtering water for a pet water fountain is also provided. The method comprises providing or receiving a pet water fountain equipped with a multi-stage filtering device in accordance with the embodiments previously described. The method further includes placing water into the basin and providing electrical power to activate the pump. When activated, the pump circulates the water across the multi-stage filtering device. The method additionally includes allowing a domesticated dog or cat to access the pet water fountain and drink from the basin.

The method may also include providing or receiving a replaceable filter cartridge. The refillable filter cartridge houses the first filtration stage, the second filtration stage, or both stages together. In such embodiments, the first stage, second stage, or both stages of filtration in the filter cartridge may be replaced with a clean first stage, a clean second stage, or a combination of clean first and second stages of filtration. More preferably, the stages reside within a singular tubular body, with the tubular body representing the replaceable filter cartridge.

The multi-stage filtration device may be in accordance with any embodiment described above or herein. The multi-stage filtering device may further comprise a UV light chamber for removal of microbes. The filtering device may optionally comprise a reverse osmosis state, an ion exchange system, or both. The multi-stage filter device may also be configured to (iv) adjust the pH of the water (v) reduce organic and inorganic particles, (vi) reduce hydrogen sulfide, (vii) reduce chlorine, (viii) reduce soluble heavy metals, or (ix) combinations thereof. The filtering device may be further configured to control scale, algae, and bacteria in the basin.

In one aspect, the stages of the multi-stage filtering device may be removed and reversed to accommodate an opposite direction of water flow. In another aspect, more than one frame holding copper zinc alloy particles may be used, or more than one frame holding granulated activated carbon particles may be used, or both. In one aspect, cells of filtration media are stacked, and water is allowed to gravitationally fall through the stacked cells en route to a water basin there below. Alternatively, water may be pumped up through the stacked filtration media residing together within a replaceable cartridge.

In another aspect, a water pH is changed or alkalinity is changed to provide water softening or to prevent scaling or mineral buildup. Preferably, the filtration device is placed adjacent the pump and behind a housing to prevent pet or child access.

BRIEF DESCRIPTION OF THE DRAWINGS

So that the manner in which the present inventions can be better understood, certain illustrations, photographs, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

A filtration system for a pet water fountain is provided herein. The filtration system utilizes a pump placed within or along a pet watering bowl. The watering bowl may be of any configuration and volume so long as a domesticated pet such as a dog or cat can access circulating aqueous contents therein.

Figure 1A:
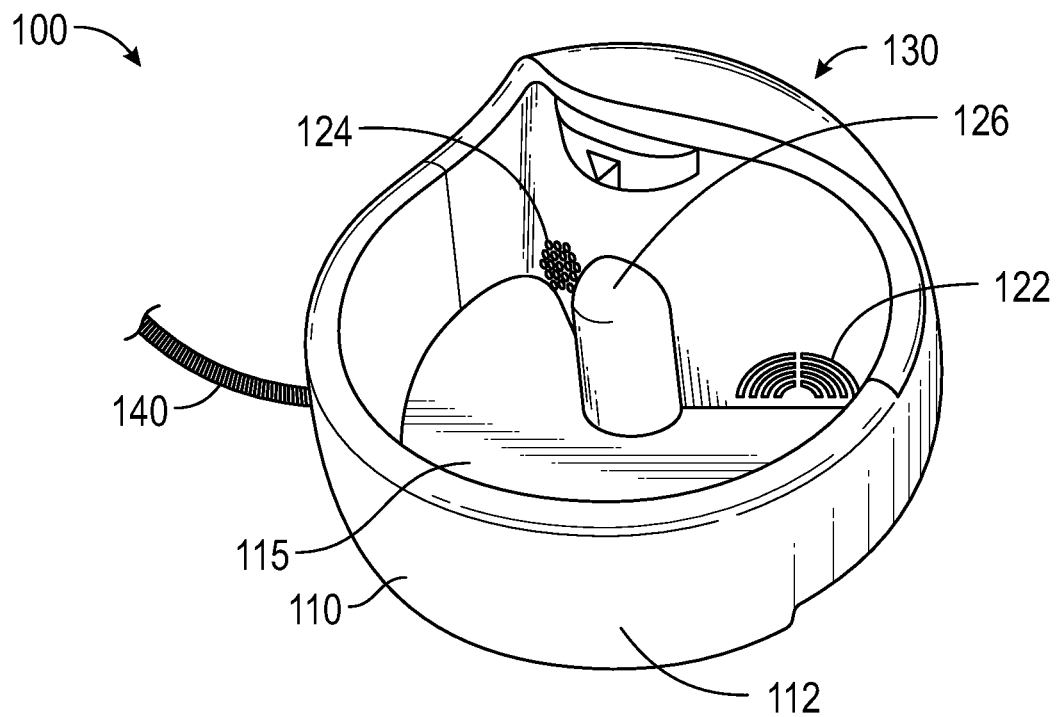
FIG. 1A is a first perspective view of an animal watering fountain as may be used in connection with the multi-stage filtration system of the present invention. The view is taken from a right side of the fountain. No water is in the basin of the illustrative fountain.

FIG. 1A is a first perspective view of an illustrative animal watering fountain 100 as may be used with the filtration systems of the present invention. The view is taken from a right side of the fountain 100.

As illustrated, the pet water fountain 100 first has a watering bowl 110. The watering bowl 110 defines a radial wall 112 and an interior basin 115. The wall 112 and the basin 115 together hold an aqueous drinking liquid, such as water. In FIG. 1A, the bowl 110 is shown without water. However, FIG. 1B is offered wherein the bowl 110 is holding water.

Figure 1B:
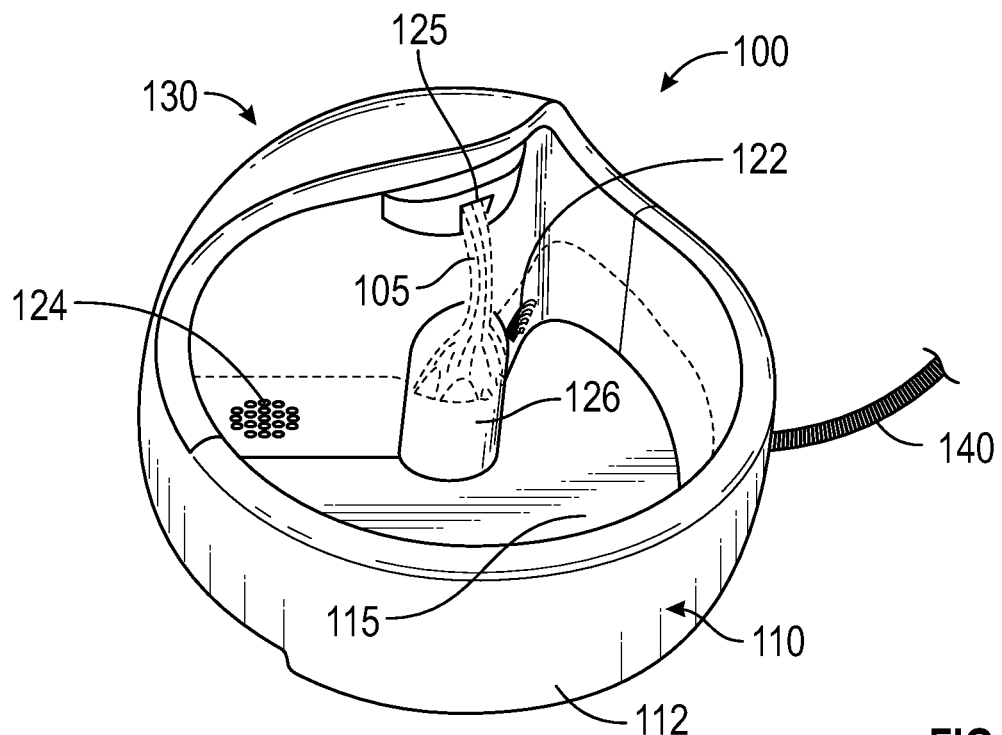
FIG. 1B is another perspective view of the animal watering fountain of FIG. 1A. Here, the view is taken from a left side of the fountain. Water is placed in the fountain and a pump is activated, creating a spout of flowing water.

FIG. 1B offers a second perspective view of the pet water fountain 100 of FIG. 1A. Here, the view is taken from the left side of the fountain 100. Water has been placed in the bowl 110. A pump (discussed below and shown in FIG. 9 at 950) has been activated, creating an aesthetically pleasing spout 105 of flowing water.

The pet water fountain 100 exists not only to hold water, but also to circulate that water so that it remains fresh and oxygenated. The flow of water from the pump (FIG. 9 at 950) may be split so that a first portion fills a reservoir and spills over through a spout 125, while a second portion circulates radially around the basin 115. In addition, the water is filtered so that it is maintained in a clean or substantially particle-free state.

Figure 1C:
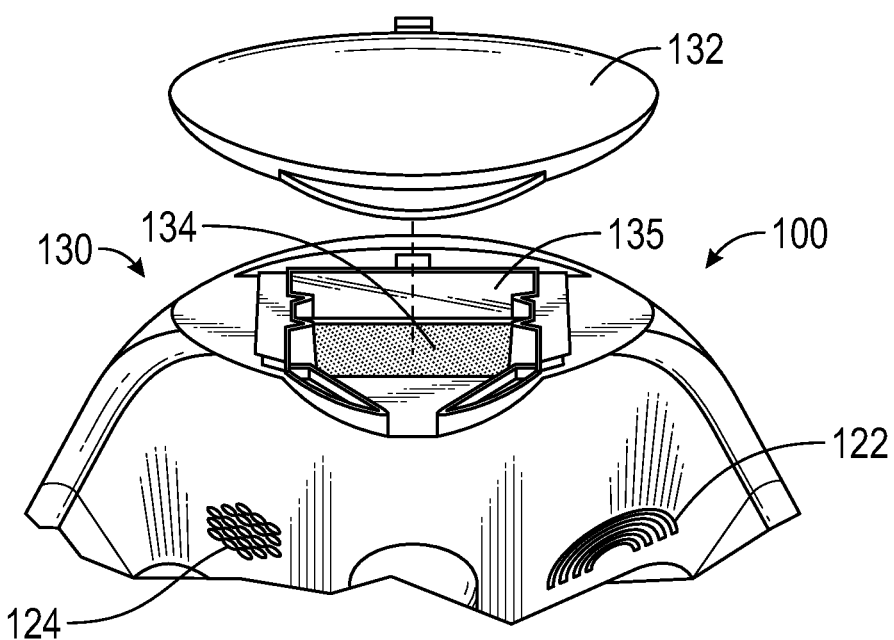
FIG. 1C is a perspective view of a portion of the housing from the animal watering fountain of FIGS. 1A and 1B. A cap has been removed from the housing, exposing a reservoir with a first stage of a filter.
Figure 1D:
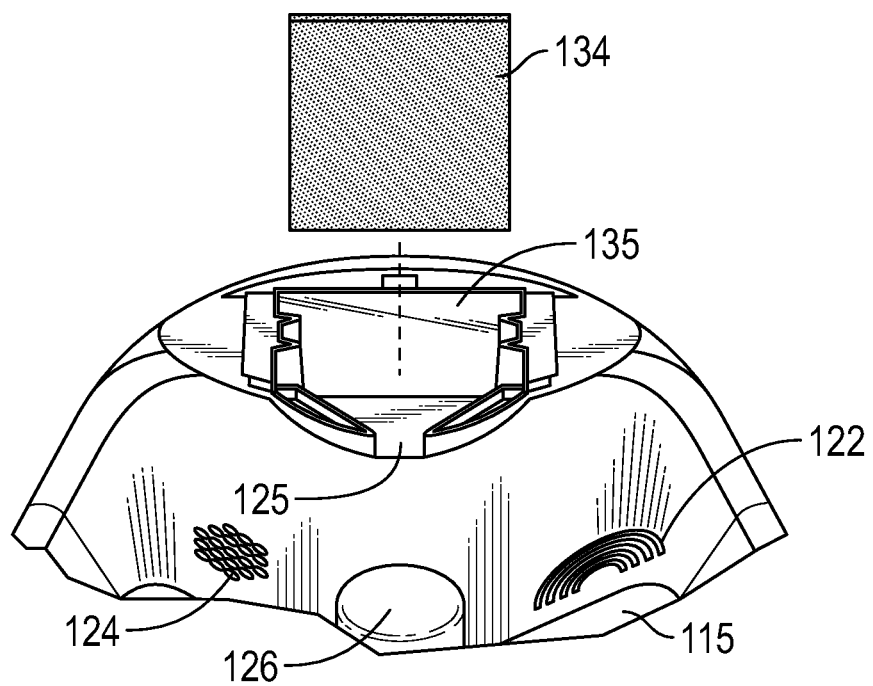
FIG. 1D is another perspective view of FIGS. 1A and 1B. Here, the cap has again been removed from the housing. An illustrative filter is shown exploded from the reservoir.

In order to provide the circulation and filtering functions, various components are provided. Those components are generally held within a housing 130 and are not visible in FIGS. 1A and 1B. However, a few of the components are shown in FIGS. 1C and 1D, discussed below.

Referring again to FIGS. 1A and 1B together, the pet watering fountain 100 also includes an inlet port 122 and an outlet port 124. In the illustrative arrangement of FIGS. 1A and 1B, the inlet port 122 and the outlet port 124 are in the form of grates formed in the housing 130. Water is drawn into the housing 130 through the inlet port 122. A first portion of water is pumped into a reservoir (shown at 135 in FIGS. 1C and 1D) and released through the spout 125, while a second portion of water is pumped back into the basin 115 through the outlet port 124. The first portion of water falls from the spout opening 125, and falls back into the basin 115, creating an aesthetically pleasing arrangement for the owner and an object of interest for the animal.

Optionally, a splash ramp 126 is provided above the water level in the basin 115. This keeps water from splattering over the wall 112 and out of the watering bowl 110.

Figure 9:
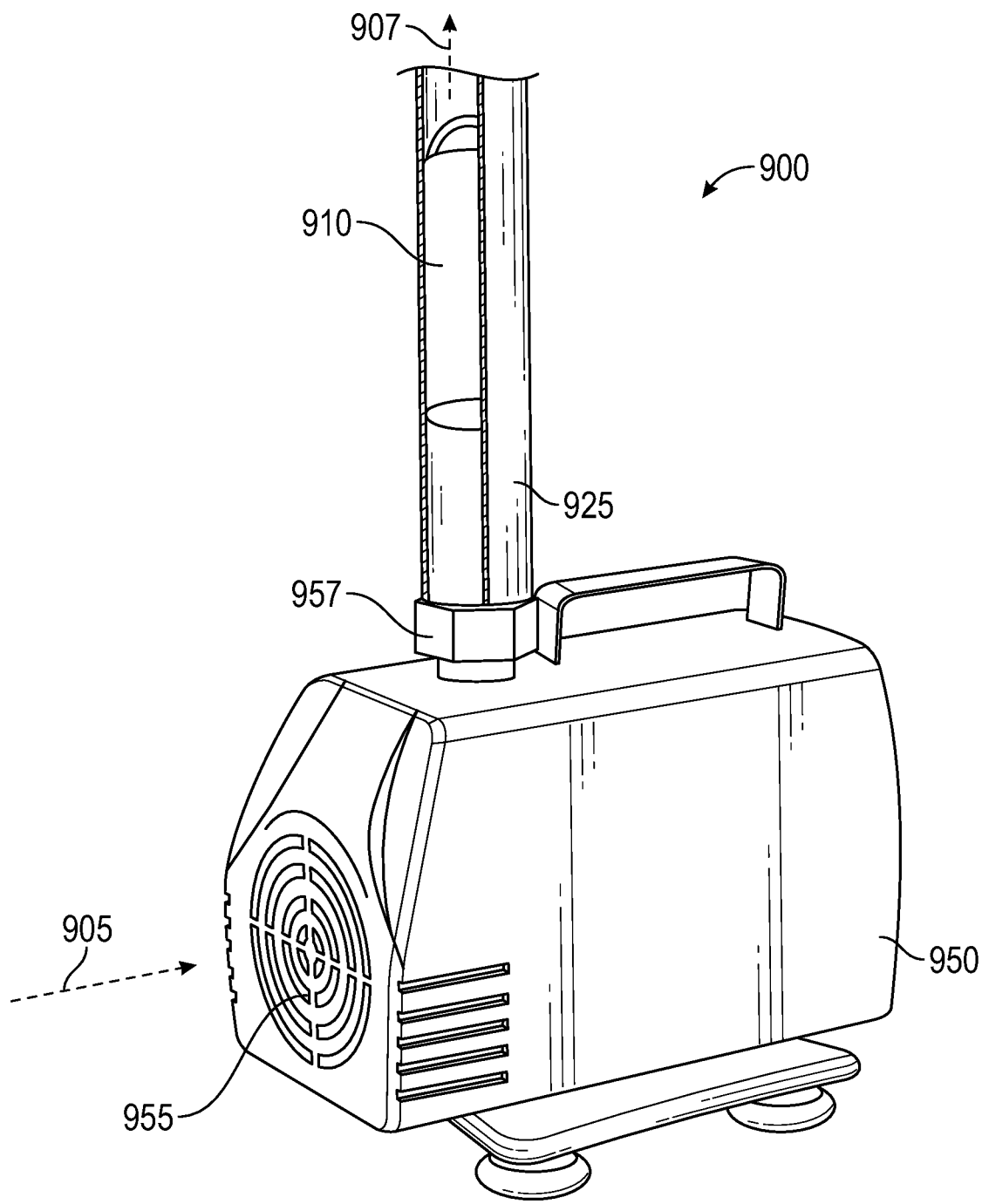
FIG. 9 is a perspective view of a filter cartridge in fluid communication with the outlet of a pump in accordance with one embodiment of the multi-stage filtration system.

The animal watering fountain 100 is designed to provide water for an animal (not shown). The animal is ideally a domesticated dog or cat. The owner fills the basin 115 with water and then activates a pump (FIG. 9 at 950). Activation may mean simply plugging in a power cord 140. The pump 950 keeps water flowing through the housing 130 and back into the basin 115. Similarly, the pump 950 keeps water flowing through a reservoir (seen at 135 in FIGS. 1C and 1D), through the spout opening 125, and back into the basin 115.

FIG. 1C is a perspective view of a portion of the housing 130 from the pet watering fountain 100. Here, it can be seen that the housing 130 includes a removable cap 132. The cap 132 is shown separated from the housing 130, revealing a reservoir 135 within the housing 130. The reservoir 135 receives water from the pump (FIG. 9 at 950) when the pump 950 is activated, e.g., when the electrical cord 140 is plugged in. As the pump 950 operates, water is moved through a pump outlet 957, causing the water level in the reservoir 135 to rise.

FIG. 1C also reveals a filter 134 residing within the reservoir 135. The filter 134 is representative of one or both stages of the multi-stage filtering device described in further detail below, in one embodiment. The filter 134 divides the reservoir 135 into two compartments. Water flows from the pump 950 into a first compartment in front of the filter 134. The water then flows through the filter 134 and into the second compartment. As water fills the second compartment, it reaches the spout opening 125 of the housing 130. The spout opening 125 thus serves as a lip over which water flows down into the basin 115.

FIG. 1D provides another perspective view of the pet water fountain 100 of FIGS. 1A and 1B. Here, the cap 132 has been removed from the housing 130 and is not seen. In addition, the filter 134 has been removed from the housing 130. The filter 134 is shown exploded above the housing 130 for illustrative purposes.

FIG. 1D also more clearly shows the inlet port 122 and the outlet port 124 in the housing 130. In addition, the splash ramp 126 is seen below the spout opening 125.

It is understood that the fountain 100 presented in FIGS. 1A, 1B, 1C and 1D is merely illustrative. The present disclosure teaches a multi-stage filtering device that may be used with the fountain 100, or with any other pet fountain having a circulating pump 950.

In one aspect, the multi-stage filtering device includes a first filtering stage comprising copper zinc alloy particles and a second filtering stage comprising granulated activated carbon particles. Each stage may constitute filtering material that is separated into an array of material placed upon a grid having a frame. The frames are placed within respective porous pouches (or are covered by a porous substrate) that closely hold the filtering material within each cell of the array. The porous substrates with filtering media are secured to or otherwise held along the cells within the respective frames.

Figure 2A:
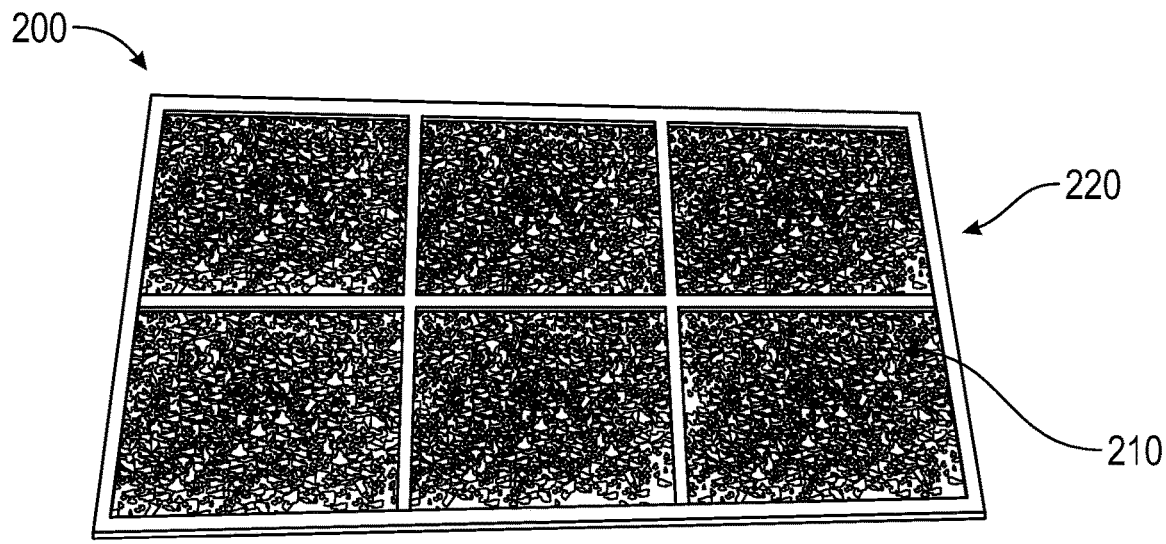
FIG. 2A is a perspective view of a first stage of a filtering system, in one embodiment. Here, particles of copper zinc alloy are used as a medium.
Figure 2B:
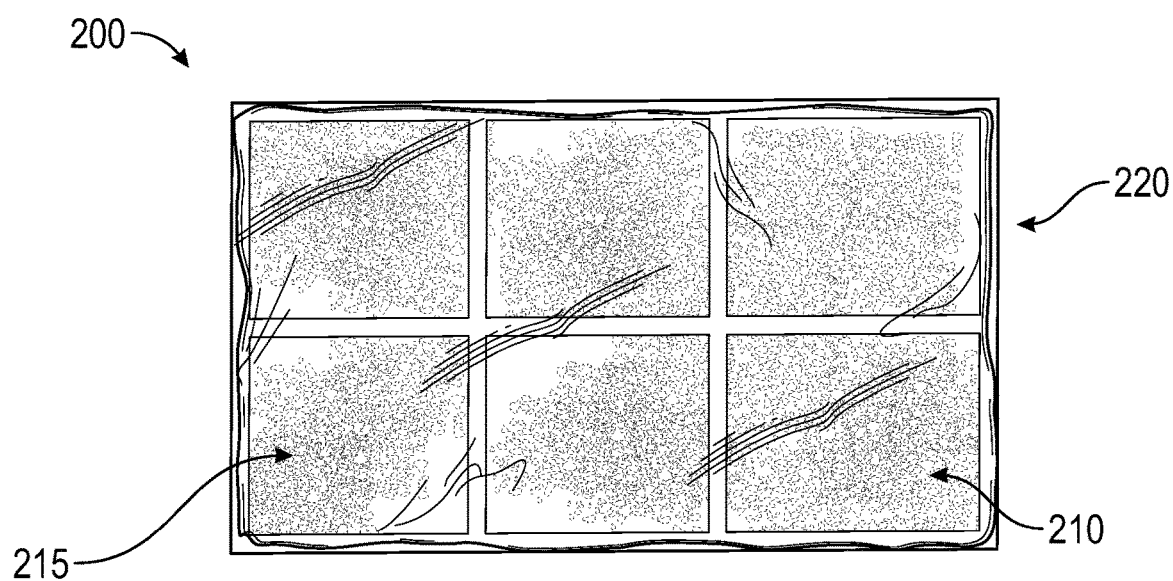
FIG. 2B is a top view of the first stage of the filtering system of FIG. 2A. Here, a porous substrate has been placed over the copper zinc alloy particles to enshroud and to hold the particles in place.

FIG. 2A is a perspective view of a first stage 200 of a filtering system, in one embodiment. Here, particles of copper zinc alloy 210 are used as a medium. A frame 220 divides the first stage 200 into discreet cells. A porous substrate has been removed for illustration revealing the particles 210. FIG. 2B is a top view of the first stage 200 of the filtering system. Here, the porous substrate 215 is placed over the copper zinc alloy particles.

The copper zinc alloy particles provide a bacteriostatic medium and also act to assist in raising the pH level of the treated water. This serves to "soften" the water during circulation. The alloy may be, for example, KDF 55 available from KDF Fluid Treatment, Inc. of Three Rivers, Mich. Alternatively, the alloy may be KDF 85 also available from KDF Fluid Treatment, Inc. Those of ordinary skill in the art will understand that municipal water supplies can contain calcium, magnesium, or other minerals that make water "hard." Such minerals can form scale and cause a variety of problems in hardware. It is believed that the KDF alloy products will remove these minerals. KDF Fluid Treatment, Inc. has represented that its process media are also non-toxic. Some of the KDF alloy products are promoted as being able to remove mercury as well.

It is observed that other copper alloys 210 may be used as the first filtering medium 200. Copper alloys 210 are metal alloys that have copper as a principal component. Copper alloys 210 are known to have a high resistance against corrosion and are frequently used as a material for piping. The first filtering medium 200 may comprise brass particles, which is copper mixed with zinc and also sometimes tin or aluminum. The first filtering medium 200 may alternatively comprise copper-nickel-zinc particles. In embodiments comprising copper-zinc alloys 210, the filtering medium 200 may include 30% to 90% copper. One embodiment may comprise about 50% copper, while another embodiment may comprise about 85% copper. The filtering medium 200 preferably comprises between 70% to 10% zinc, inclusive. One embodiment may comprise about 50% zinc, while another embodiment may comprise about 15% zinc.

It is further observed that the first filtering medium 200 may include small amounts of salt, such as potassium chloride or sodium chloride. Softening salt pellets are available at many retail outlets. These salts will further act to soften the water during circulation.

A copper-zinc alloy 210 may be used as part of an oxidation reduction process, or electro-chemical reaction. During this reaction, electrons are transferred between molecules, and new elements are created. For example, chlorine is changed into benign, water-soluble chloride particles which are then filtered or harmlessly circulated. Similarly, some heavy metals such as lead and mercury are effectively removed from the water by plating out into the medium's surface.

Figure 3A:
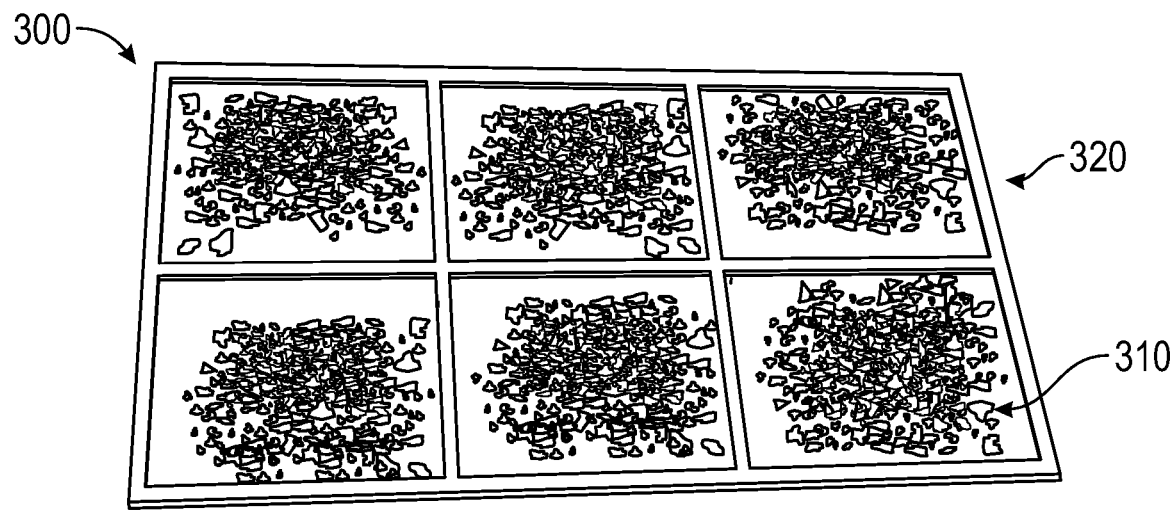
FIG. 3A is a perspective view of a second stage of a filtering system, in one embodiment. Here, granulated activated carbon is used as a medium.
Figure 3B:
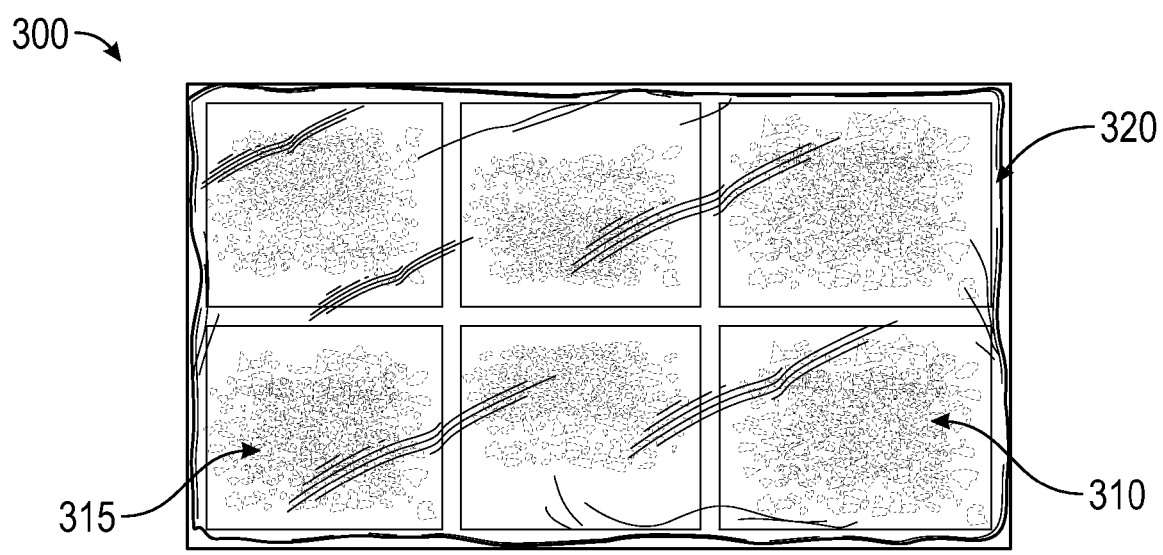
FIG. 3B is a top view of the second stage of the filtering system of FIG. 3A. Here, a porous substrate has been placed over the granulated activated carbon particles to enshroud and hold the particles in place.

FIG. 3A is a perspective view of a second stage 300 of a filtering system, in one embodiment. Here, granulated activated carbon particles 310 are used as a medium. A frame 320 divides the second stage 300 into discreet cells. A porous substrate has again been removed for illustration. FIG. 3B is another top view of the second stage 300 of the filtering system. Here, the porous substrate 315 is placed over the granulated activated carbon particles 310.

The granulated activated carbon medium 310 helps remove chlorine, lead, pesticides, and heavy metals from water. This, in turn, can improve the taste and odor of water sourced from municipal water supplies. The carbon filter granules 310 may be derived, for example, from coconut fiber. The coconut carbon helps stimulate adsorption and catalytic oxidation to remove chlorine and sediment from the circulating water. The granulated activated carbon medium 310 also serves as a carbon filter to remove, or at least reduce the presence of, certain sized physical and sediment impurities from the water. In one embodiment, the carbon filter granules can remove particles down to 5 microns in size and can also capture particles that may shelter living organisms from being fully exposed during an optional UV treatment process, described below.

In each of the first 200 and second 300 stages, a frame 220, 320 is used to support the particles 210, 310. The first stage filtration particles 210 are supported along frame 220 while the second stage filtration particles 310 are supported along frame 320. Each frame 220, 320 preferably comprises an array of cells. In the illustrative frames 220, 320, a 2×3 array of cells is shown. However, it is understood that other arrays may be considered.

In other embodiments, the first 200 and second 300 filtration particles may share a single frame. In such embodiments, the first filtration stage 200 may be disposed vertically along a front face of the frame, and the second filtration stage 300 may be disposed vertically along a back face of the frame, thereby allowing water to pass horizontally through the first 200 and second 300 filtration particles before consumption. Alternatively, the first 200 and second 300 filtration particles may be interspersed along both faces of a shared frame.

In any aspect, the first 200 and second 300 stages are illustrated together by filter 134.

It is again observed in FIGS. 2B and 3B that the particles 210, 310 are covered by the porous substrates 215, 315. The substrates 215, 315 may also represent pouches that receive particles 210, 310. In either instance, the porous substrates 215, 315 are disposed within respective cells inside the frames 220, 320, and closely hold the particles 210, 310.

It is noted here that the use of the terms "first stage" and "second stage" are not intended to imply a sequence or order of filtering; rather, these terms simply indicate that two separate filtering steps are being taken. Thus, in one aspect, water may first flow through a filtration medium comprised of copper zinc alloy particles 210, and then flow through a second filtration medium comprised of granulated activated carbon particles 310. Alternatively, water may first flow through a filtration medium comprised of granulated activated carbon particles 310 and then flow through a second filtration medium comprised of copper zinc alloy particles 210. Alternatively still, more than one layer (or medium) of copper zinc alloy particles 210 may be used and/or more than one layer (or medium) of granulated activated carbon particles 310 may be used.

It is also noted here that the use of the terms "circulate" or "circulation" are not intended to imply the movement of liquid only in a circular fashion. Instead, these terms are simply meant to indicate that the liquid will be pumped through specified areas of a basin or other areas of a watering fountain.

Both filtration media may reside proximate the water inlet 955 of the pump 950. Alternatively, both filtration media may reside proximate the water outlet 957 of the pump 950. Alternatively still, one filtration medium may reside proximate the pump 950 while the other resides in front of or within the reservoir 135.

Figure 4:
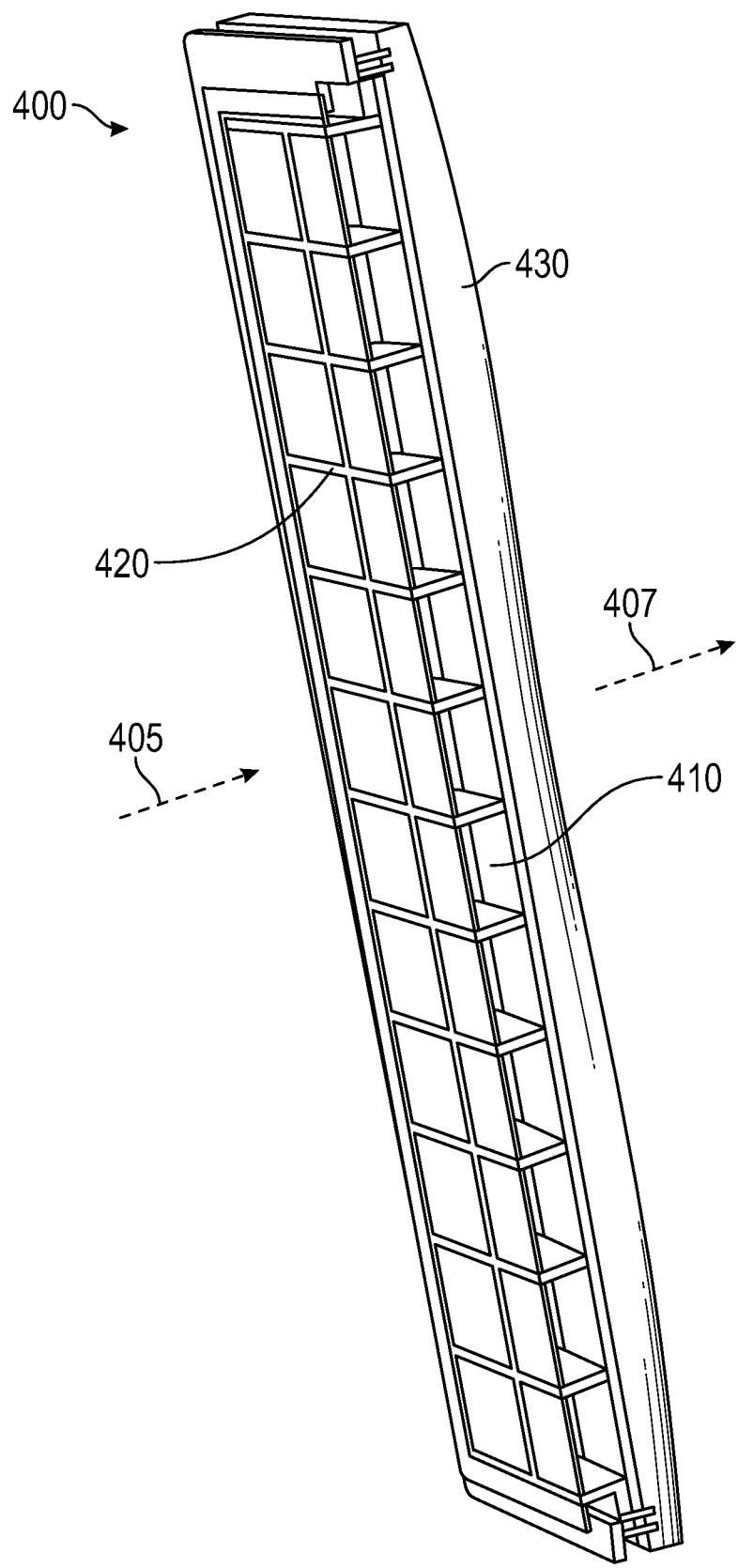
FIG. 4 is a perspective, cross-sectional view of a multi-stage filter cartridge as may be used in a vertical filter system for a pet watering fountain. The filter cartridge comprises a frame that defines an array of cells.

FIG. 4 is a perspective, cross-sectional view of a multi-stage filter cartridge 400 as may be used in a vertical filter system for a pet watering fountain. The filter cartridge 400 comprises a frame 420 that defines an array of cells 410. The first stage 200 of filtration may be housed within the array of cells 410. As discussed in conjunction with FIGS. 2A and 2B, the first filtering stage 200 may comprise copper zinc alloy particles 210 that are encapsulated in a porous screen 215. In the FIG. 4 embodiment, a 2×12 array of cells is shown. However, it is understood that other arrays may be considered. The back portion of the filter cartridge 400 includes a compartment 430 for accommodation of the second stage 300 of filtration. As discussed in conjunction with FIGS. 3A and 3B, the second filtering stage 300 may comprise granulated activated carbon particles 310 that are encapsulated in a porous screen 315. The encapsulated active carbon particles 310 may be divided within discreet cells or may exist in a single cell that extends through the compartment 430.

In operation, the filter cartridge 400 of FIG. 4 may be disposed vertically within a watering fountain as generally shown at 134 of FIGS. 1C and 1D. When so disposed within the reservoir (135 at FIG. 1D), unfiltered water enters the filter cartridge 400 in the direction of arrow 405. Filtered water then exits the filter cartridge 400 in the direction of arrow 407, spills over the spout opening (shown at 125 of FIG. 1D) and flows into the basin (115 of FIG. 1B) for consumption.

Figure 5:
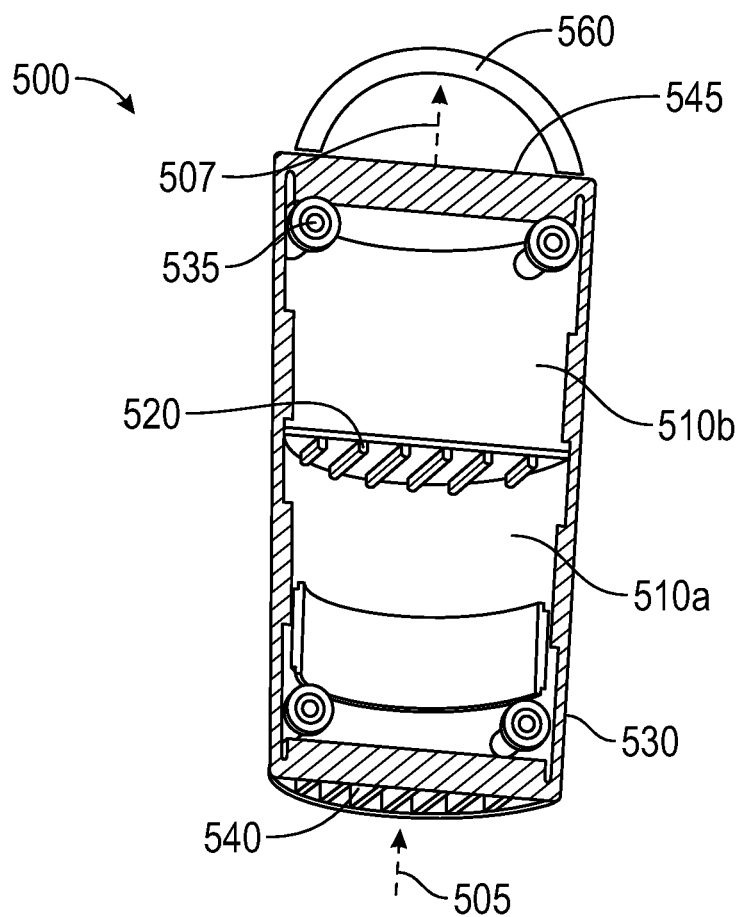
FIG. 5 is a cut-away view of a filter cartridge as may be used for holding a multi-stage filter for a pet watering fountain, in one aspect.

FIG. 5 is a cut-away view of a filter cartridge 500 in an alternate embodiment as may be used for holding a filter for a pet watering fountain. The filter cartridge 500 comprises a cylindrical container 530 that is divided into a first housing 510A that accommodates the first filtering stage 200 and a second housing 510B that accommodates the second filtering stage 300. It is understood that the first housing 510A may alternatively accommodate the second filtering stage 300, and the second housing 510B may alternatively accommodate the first filtering stage 200. A permeable wall 520 may be disposed between the first 510A and second 510B housings. A similar cartridge may be designed that only holds a single filtering medium. Cartridges may also be designed to hold more than two filtering media.

The filter cartridge 500 may additionally include a mechanism 535 for reversibly attaching the filter cartridge 500 to the watering fountain or to reversibly join two halves of the filter cartridge 500. Such a mechanism 535 allows a user to replace the first 200 and second 300 filter stages without having to discard the filter cartridge 500. As shown, the mechanism 535 may comprise openings to receive respective screws. Additional mechanisms 535 may be employed for reversible attachment of the filter cartridge 500. The filter cartridge 500 may further include a handle 560 to allow for easy removal of the cartridge 500 from the pet watering fountain.

As shown in FIG. 5, water is pumped in the direction of arrow 505 though an inlet port 540 of the filter cartridge 500. Water then passes through the first 200 and second 300 filter stages before exiting the filter cartridge at an exit port 545 in the direction of arrow 507. The water may optionally flow through the filter cartridge 500 in the opposite direction.

Figure 6:
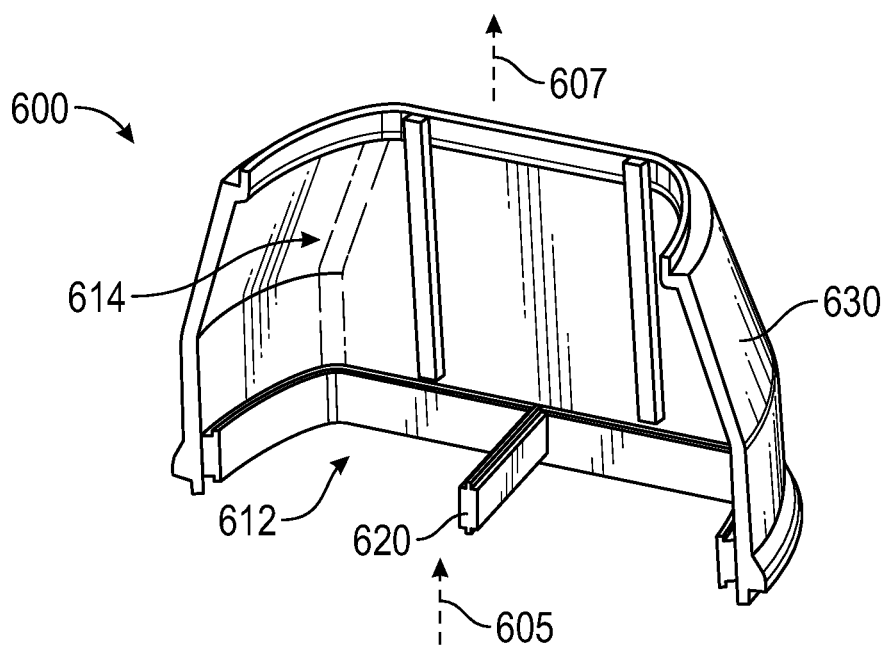
FIG. 6 is a cut-away view of a portion of a filter cartridge as may be used for housing a multi-stage filter for a pet watering fountain, in another aspect.

FIG. 6 is a cut-away view of a portion of a filter cartridge 600 as may be used for housing a multi-stage filter for a pet watering fountain, in yet another embodiment. The filter cartridge 600 includes a generally tubular body 630 that slightly tapers at an upper portion 614. The lower portion 612 of the filter cartridge 600 provides a compartment for the first filtering stage 200, such as copper-zinc alloy particles 210. The upper portion 614 provides a compartment for the second filtering state 300, which may comprise granulated activated carbon particles 310. In this manner, the first 200 and second 300 filtering media are stacked within a single tubular body 630. Again, it is understood that the location of the filtering media 200, 300 may be swapped in alternate embodiments.

The filter cartridge 600 may additionally include a frame 620. The frame 620 supports the filtering media 200, 300. The filtering media 200, 300 are preferably encapsulated within a porous substrate 215, 315. The porous substrate 215, 315 may be attached directly to the lower and upper ends of the filter cartridge 600 to encapsulate the respective filtering media 200, 300. A similar cartridge may be designed that holds only a single filtering medium. Cartridges may also be designed to hold more than two filtering media.

In operation, water enters the filter cartridge 600 at the bottom end of lower portion 612 in the direction of arrow 605. The water then flows in the direction of arrow 607 through the filtering media 200, 300 before exiting the filter cartridge 600 at the top end of the upper portion 614. In one arrangement, the water may flow through the filter cartridge 600 in the opposite direction.

Figure 7:
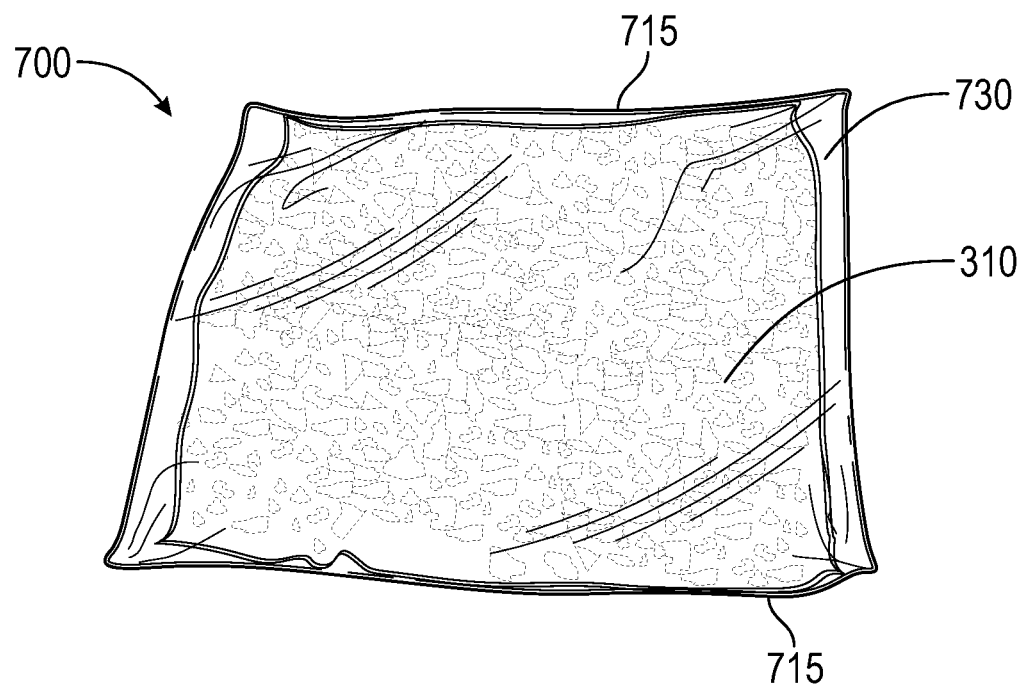
FIG. 7 is a cross-sectional view of a tubular filtration device, showing granular activated carbon within a pouch.

FIG. 7 is a cross-sectional view of a pouch 730 serving as an in-line filter 700. Here, granular activated carbon particles 310 are shown residing within the pouch 730, and a porous screen 715 is shown at two ends of the planar pouch 730 to hold the carbon particles 310 in place.

Figure 8A:
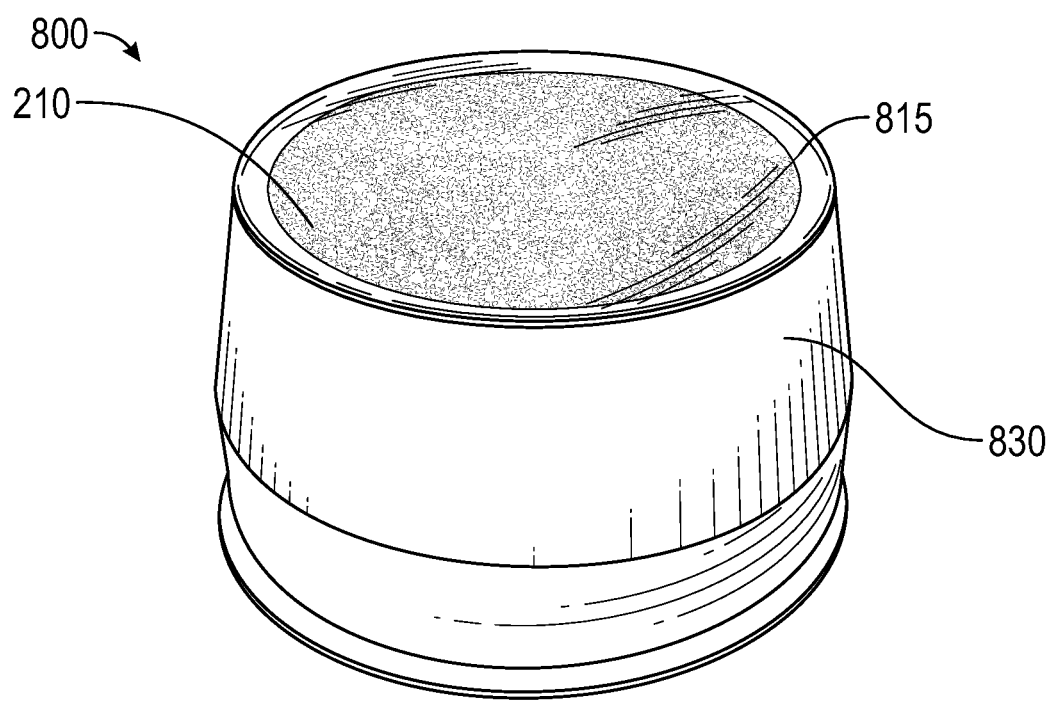
FIG. 8A is a perspective view of a two-stage filter in one embodiment. Here, the filtration media are encased within a tubular body. A copper zinc alloy stage is visible as a porous substrate.

FIG. 8A is a perspective view of the external surface of a two-stage filter 800, in one embodiment. Here, the filter 800 defines a tubular body 830 that is dimensioned to reside within or along a tubing (as shown in a FIG. 9 at 925) extending from the pump inlet 955 or the pump outlet 957. In the view of FIG. 8A, copper zinc alloy particles 210 reside within the tubular body 830, and are held in place by a porous screen 815. The copper zinc alloy particles 210 represent the first stage 200 of the filter 800.

Figure 8B:
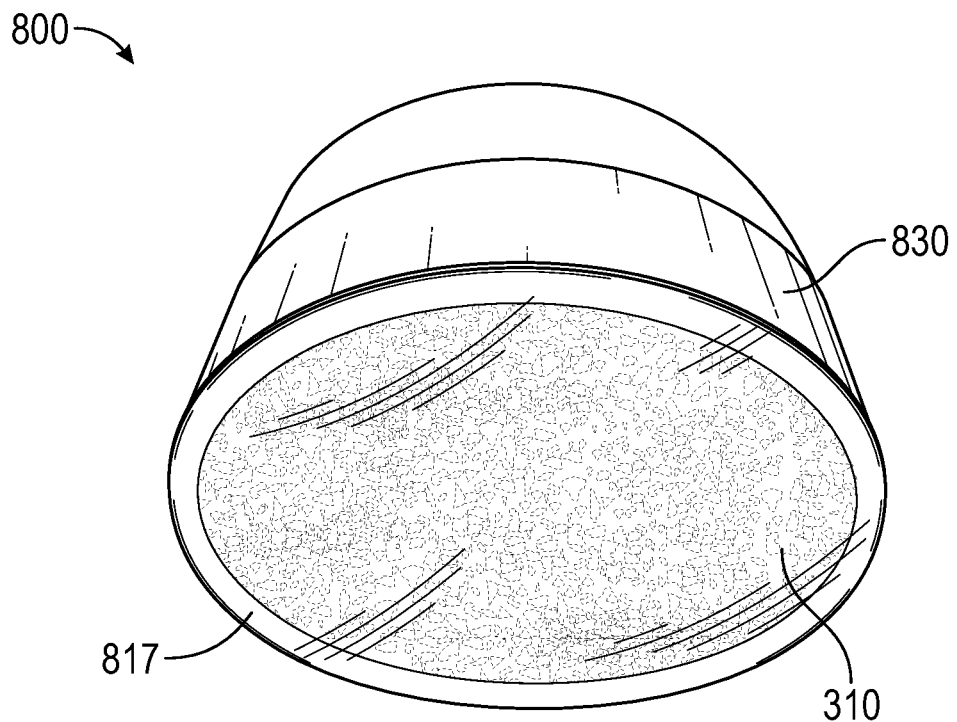
FIG. 8B is another perspective view of the two-stage filter of FIG. 8A, with the filter being flipped. Here, a granulated activated carbon stage is visible as a porous substrate.

FIG. 8B is another perspective view of the two-stage filter 800 of FIG. 8A, but with the tubular body 830 being flipped. Here, activated carbon particles 310 reside within the tubular body 830 and are also held in place by a porous screen 817. The carbon particles 310 represent the second stage 300 of the filter 800.

Figure 8C:
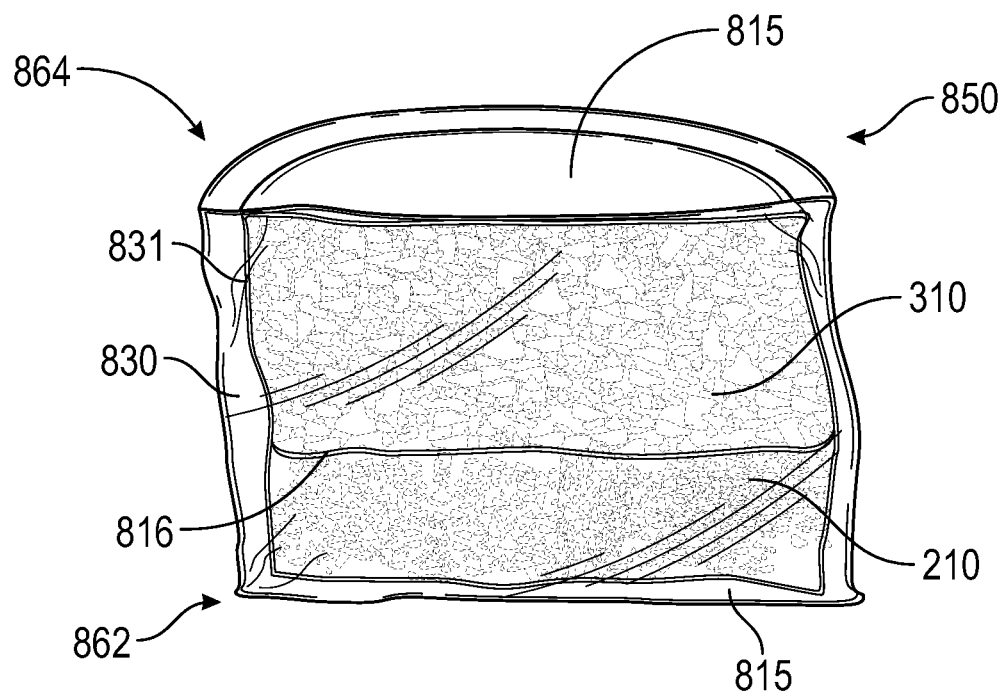
FIG. 8C is a perspective, cross-sectional view of a two-stage filter with a tubular body, showing both first and second stage filtering media.
Figure 8D:
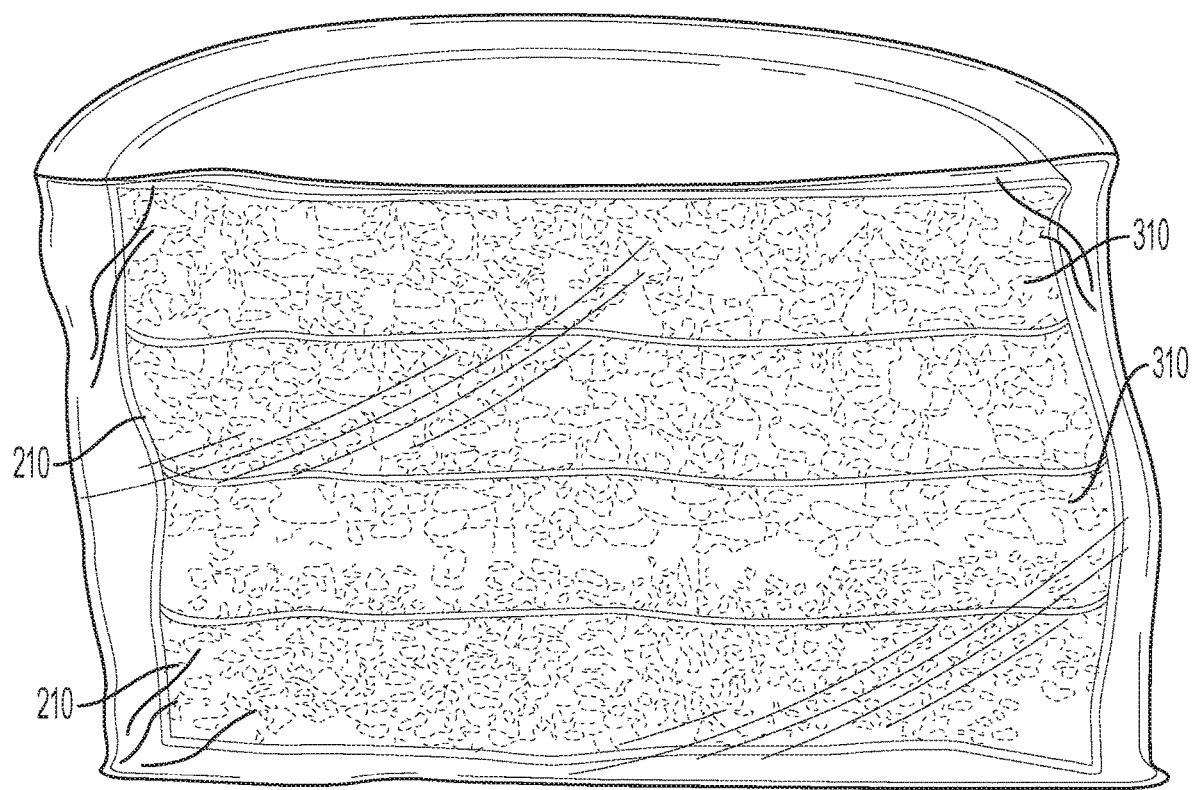
FIG. 8D is a perspective, cross-sectional view of a four-stage filter with a tubular body.

FIG. 8C is a cross-sectional view of an in-line filter 850 that comprises a tubular body 830. Here, a tubular pouch 831 is contained within the tubular body 830. The tubular pouch encases particles 210, 310, serving as the first 200 and the second 300 stages of a filtering system. The copper zinc alloy particles 210 reside at a first end 862 of the tubular pouch 831, while the granular activated carbon particles 310 reside at a second end 864 of the tubular pouch 831. A porous screen 815 is shown at opposing open ends of the tubular body 830 to close the opposing open ends of the tubular body 830 and to hold the tubular pouch 831 in place. Optionally, an additional porous screen 816 may be disposed between the first 210 and second 310 particles of the filtering system 850. FIG. 8D shows an embodiment of the tubular pouch seen in FIG. 8C that includes a four stage filter with two first stage compartments 210 and two second stage compartments 310, with the first and second stage compartments alternating in series.

In the arrangements of FIGS. 7, 8A, 8B, and 8C, the filtering particles 210, 310 are held within the tubular body 730, 830 at each end by a porous screen 715, 815, 817. The illustrative screens 215, 315, 715, 815, 816, 817 may comprise pores of any size that closely hold the first 200 and second 300 filtering media in place. The screens 215, 315, 715, 815, 816, 817 themselves may serve a filtering function, having pores with limited openings. For filtering functions, the screens 215, 315, 715, 815, 816, 817 may comprise pores of up to 1,000 microns in size. Embodiments may comprise pores that are up to 100 microns in size. In alternate embodiments, the pores may range from 0.2 microns to 2 microns in size. Some embodiments may comprise pores that are about 0.5 microns in size. Those of ordinary skill in the art will understand that as the diameter of the screen openings is reduced and as the porosity of the filtering particles is lowered, the capacity of the pump 950 needs to be increased.

FIG. 9 is a perspective view of an illustrative pump 950 as may be used in connection with the a multi-stage filtration system 900. In this arrangement, a filter cartridge 910 is in fluid communication with an outlet 957 of the pump 950. The filter cartridge may be, for example, the filter cartridge 500 of FIG. 5.

A tubing 925 is shown extending from the pump outlet 957, and a portion of the tubing 925 has been cut away to reveal the filter cartridge 910 that resides therein. The tubing 925 is configured to allow for removal and replacement of the filter cartridge 910 and its filtering media 200, 300 after a period of use. Although shown adjacent the pump outlet 957 in FIG. 9, it is to be under stood that the filter cartridge 910 may reside either downstream or upstream of the pump 950. For example, the filter cartridge 910 may reside adjacent the pump inlet 955.

In operation of the pump 950 of FIG. 9, water enters the pump 950 at the pump inlet 955 in the direction of arrow 905. The pump 950 then propels water to the pump outlet 957 and through the filter cartridge 910, where water is filtered via filtering media 200, 300. Water then exits the filter cartridge 910 in the direction of arrow 907 and continues through the tubing 925 to be delivered to the water basin (115 of FIG. 1A) for consumption.

It should be understood that the multi-stage filtration system 900 as depicted in FIG. 9 may be configured or adapted to incorporate any filter cartridge 910, housing, or filtering media 200, 300 that would be apparent to those having skill in the art or described elsewhere in this application. In embodiments, the filter cartridge 910 may be integral with the tubing 925 (as shown). Alternatively, the filter cartridge 910 may exist as an independent housing for filtering media 200, 300 that may be separately removable for simplified cleaning and replacement of the filtering media 200, 300.

In any arrangement, the filtering system 900 preferably utilizes the pump 950 to circulate water through the system. The pump 950 is a submersible pump operating, for example, at 50-60 Hz and about 5.2 volts of power. The pump 950 may be, for example, the SP-880 aquarium pump manufactured by Resun™ of Shenzhen, China. The pump 950 may have a valve that allows the operator to adjust the water flow. In one aspect, the pump 950 pumps up to about 370 liters of fluid per hour.

Where a submersible pump 950 is used, the pump 950 will reside within the water basin 115. However, the filtration systems and the pet fountains herein may operate successfully with pumps that reside along the bowl 110 but above the water line of the basin 115. In this instance, the pump 950 will have a tube (not shown) extending from the pump inlet 955 to bring water into the pump 950 and then a separate tube extending from the pump outlet 957 to deliver water back to the basin 115. The filtering system may reside either upstream of or downstream of the pump 950.

A method for filtration of water for a pet fountain is also disclosed herein. In accordance with the method, a pet owner receives or is provided with a pet fountain. The pet fountain includes a basin 115, and a pump 950 residing within or along the basin 115. The basin 115 works as a wall 112 to serve as a watering bowl 110 and may be of any configuration and volume so long as a domesticated pet such as a dog or cat can access the liquid contents.

The method also includes inserting a multi-stage filtration device within the basin and in fluid communication with the pump 950. The multi-stage filtration device may be in accordance with any embodiment described herein. The multi-stage filtration device may be pre-inserted when the pet owner receives the pet fountain or may be inserted or replaced by the pet owner after purchase.

As part of the method, additional filtering or treatment steps may be employed. In one aspect, a third stage may be used that includes an anion resin bed. The anion resin bed contains positively charged resins that can remove negatively charged ions from the inflowing water stream. Negatively charged ions may include arsenates, nitrates, sulfides and sulfates. Alternatively, the resin bed may contain positively charged resins.

In another step, a UV chamber may be provided in a pet water fountain. The UV chamber comprises an ultraviolet light that kills microbes to further purify the water without lowering the pH of the water. Such treatment can kill bacterium, fungi and viruses. In one embodiment, the UV reactor unit can be selected to meet U.S. Pharmacopeia standards for purification. The inclusion of a UV treatment device can also possibly provide immunity from "boil water" orders that are sometimes issued during or after municipal water system damage or repairs.

The device and method disclosed herein provide a multi-stage design that allows the pet owner to provide cleaner, better tasting water for a pet. At the same time, the design allows the pet owner to go longer times without having to clean the basin and fountain components. In one aspect, the filtration stages herein produce a slightly alkaline water, which is believed to have positive health benefits by aiding the absorption of oxygen into the water rather than repelling or expelling oxygen from the water.

Variations of the filtering device and of the methods for filtering water for a pet fountain herein, may fall within the spirit of the claims, below. It will be appreciated that the inventions are susceptible to modification, variation, and change without departing from the spirit thereof.

EXAMPLES

An example is provided below to facilitate a more complete understanding of the invention. The following example illustrates an exemplary mode of making and practicing the invention. However, the scope of the invention is not limited to specific embodiments disclosed in this Example, which is for purposes of illustration only, since alternative methods can be utilized to obtain similar results.

Example 1

One of the challenges with pet fountains is keeping the watering bowl and filtering components clean. If fountains are not properly cleaned and maintained, the benefits of animal watering fountains can be reduced or even reversed. This typically requires the frequent disassembling of the fountain, rinsing of the filtering media, and washing of the small pump and basin. Some of this cleaning may involve the removal of scale and mineral deposits.

Given the cumbersome process of cleaning a pet watering bowl and fountain, an objective the filtering system and pet fountain in accordance with embodiments of the present invention is to provide a pet fountain that requires less frequent cleaning.

To study the effects of an embodiment of the water filtering system on bowl cleanliness, an experiment was performed wherein a control watering fountain that employs a standard submersible filter was allowed to run undisturbed for a period of 14 days. A second watering fountain that employs a filtering system in accordance with an embodiment of the present invention was also allowed to run undisturbed for the same 14-day period.

After the 14-day test period, an accumulation of scale and scum were visible in the bowl of the control watering fountain. By contrast, no accumulation of scale or scum was visible after the 14-day test period utilizing the second watering fountain due to the properties of the first 200 and second 300 stages of treatment. The bowl using the second watering fountain was substantially cleaner and shinier than the bowl of the control watering fountain.

The invention claimed is:

1. A pet water fountain comprising:
   a basin configured to hold a volume of water accessible to a domesticated pet;
   a pump having a pump inlet and a pump outlet, the pump residing in a portion of the basin and being configured to circulate water within the basin when activated;
   tubing connected to the pump outlet; and
   a filtering device configured to filter water during circulation, wherein the filtering device comprises a tubular pouch, wherein a first filtration stage and a second filtration stage together reside in the tubular pouch, the tubular pouch residing in a tubular body, a first porous screen covering a first open end of the tubular body, a second porous screen covering a second opposite open end of the tubular body, wherein the first and second porous screens maintain the tubular pouch in place within the tubular body during water circulation, wherein the tubular body is disposed within the tubing connected to the pump outlet.

2. The pet water fountain of claim 1, wherein:
   the domesticated pet is a dog or a cat;
   the pump is a submersible pump; and
   the pump resides within the basin.

3. The pet water fountain of claim 1, wherein:
   the first filtration stage of the filtration device comprises copper alloy particles; and
   the second filtration stage of the filtration device comprises granulated activated carbon particles.

4. The pet water fountain of claim 3, wherein:
   the first filtration stage and the filtration second stage reside near the pump outlet.

5. The pet water fountain of claim 3, wherein:
   the copper alloy is a copper zinc alloy;
   the tubular pouch is in fluid communication with the pump outlet; and
   a third porous screen separates the first stage and the second stage.

6. The pet water fountain of claim 5, wherein:
   the tubular pouch holds at least two first stage filtration compartments and at least two second stage filtration compartments, with the first and second stage filtration compartments alternating in series.

\* \* \* \* \*